(12) United States Patent
Usui et al.

(10) Patent No.: US 11,002,711 B2
(45) Date of Patent: May 11, 2021

(54) DETECTION SYSTEM, DETECTION METHOD, AND SERVER DEVICE

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Takashi Usui, Saitama (JP); Yasuo Yoshii, Kawasaki (JP); Kazuo Watabe, Yokohama (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 212 days.

(21) Appl. No.: 16/284,282

(22) Filed: Feb. 25, 2019

(65) Prior Publication Data

US 2020/0080970 A1    Mar. 12, 2020

(30) Foreign Application Priority Data

Sep. 6, 2018 (JP) .............................. JP2018-167130

(51) Int. Cl.
*G01N 29/14* (2006.01)
*G01M 13/045* (2019.01)

(52) U.S. Cl.
CPC .......... *G01N 29/14* (2013.01); *G01M 13/045* (2013.01)

(58) Field of Classification Search
CPC .............................. G01N 29/14; G01M 13/045
USPC .............................................................. 73/587
See application file for complete search history.

(56) References Cited

U.S. PATENT DOCUMENTS

| 4,352,038 A * | 9/1982 | Moreton ................. G10K 11/24 |
| | | 310/323.19 |
| 4,562,736 A * | 1/1986 | Iwasaki ................... G01N 25/72 |
| | | 73/587 |
| 5,351,655 A * | 10/1994 | Nuspl .................... F22B 37/421 |
| | | 122/504 |
| 6,826,982 B2 * | 12/2004 | O'Brien .............. G01M 5/0033 |
| | | 73/587 |
| 2011/0112775 A1 | 5/2011 | Bramban |
| 2016/0139084 A1 * | 5/2016 | Usui ................... G01N 29/4445 |
| | | 73/587 |

(Continued)

FOREIGN PATENT DOCUMENTS

| JP | 2008-536756 | 9/2008 |
| JP | 4874406 B2 | 2/2012 |
| JP | 2020-112396 A | 7/2020 |

*Primary Examiner* — Lisa M Caputo
*Assistant Examiner* — Rose M Miller
(74) *Attorney, Agent, or Firm* — Oblon, McClelland, Maier & Neustadt, L.L.P.

(57) ABSTRACT

According to one embodiment, a detection system includes a base member, a plurality of sensors, and one or more processors. The plurality of sensors are provided on the base member, and detect an elastic wave from a test object of a plurality of test objects. The elastic wave propagates through a connecting member among a plurality of connecting members that connect the test objects with the base member. The connecting members each have a thickness smaller than a wavelength of the elastic wave. The one or more processors detect an abnormality of the test objects based on the detected elastic wave.

9 Claims, 7 Drawing Sheets

(56) References Cited

U.S. PATENT DOCUMENTS

2020/0217822 A1 7/2020 Someda et al.

\* cited by examiner

DETECTION SYSTEM, DETECTION METHOD, AND SERVER DEVICE

CROSS-REFERENCE TO RELATED APPLICATIONS

This application is based upon and claims the benefit of priority from Japanese Patent Application No. 2018-167130, filed on Sep. 6, 2018; the entire contents of which are incorporated herein by reference.

FIELD

Embodiments described herein relate generally to a detection system, a detection method, and a server device.

BACKGROUND

Techniques for detecting defects in target structures (test objects) to be inspected without destructing them have been known. Such a technique is what is called nondestructive testing. In particular, recent advancement of information technology has increased a demand for detecting, or monitoring, defects of structures while the structures are in operation, or without stopping their functions. One of the examples of such techniques for detecting defects in structures is the acoustic emission (AE) method. The AE method detects elastic waves generated upon formation or growth of internal cracks by using high-sensitivity sensors.

However, such conventional techniques, in some cases, fail to detect defects without harming functions of test objects with a simple configuration.

DETAILED DESCRIPTION

Figure 1:
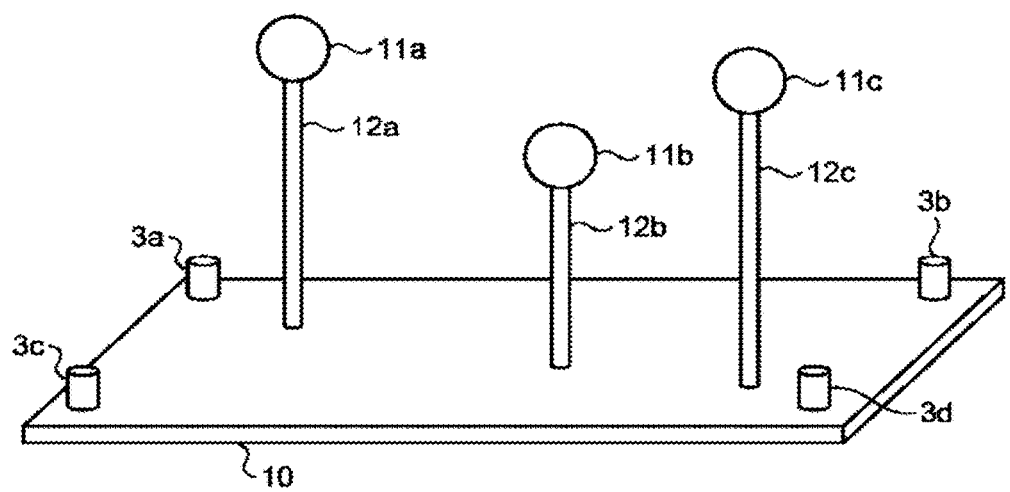
FIG. 1 is a schematic diagram illustrating an example configuration of a detection system according to an embodiment of the present disclosure.

According to one embodiment, a detection system includes a base member, a plurality of sensors, and one or more processors. The plurality of sensors are provided on the base member, and detect an elastic wave from a test object of a plurality of test objects. The elastic wave propagates through a connecting member among a plurality of connecting members that connect the test objects with the base member. The connecting members each have a thickness smaller than a wavelength of the elastic wave. The one or more processors detect an abnormality of the test objects based on the detected elastic wave.

The following describes a preferred embodiment of a detection system according to the present disclosure with reference to the accompanying drawings.

Acoustic emissions are elastic waves generated in accordance with the growth of a fatigue crack in a material. In the AE method, AE sensors including piezoelectric elements are used to detect the elastic waves as voltage signals (AE signals). AE signals are signs detected before the breakage of material, and thus the frequency and intensity of the AE signals can be used as indices for representing the material's health. In this regard, researchers have been focusing on studies of detecting signs of deterioration of a structure by using the AE method. In particular, the AE method is widely used in detecting corrosion of oil storage tanks and detecting failures in the manufacturing process of machinery. In addition, detection techniques using the AE method have been standardized.

One of the techniques of the AE method known in the art is source location, in which a plurality of sensors are used to detect a difference in time at which an elastic wave reaches the respective sensors, whereby the source of the elastic wave is detected.

Typically, a plurality of test objects to be inspected for defects (abnormalities) are disposed in a three-dimensional space as elements of a certain system that have certain functions. Moreover, the locations of the test objects in the three-dimensional space are typically restricted by the system. To determine the location of a defective test object out of a plurality of test objects, a possible configuration is attaching a sensor directly to each of the test objects. However, if, for example, the test objects include movable members, directly attaching the sensors to the test objects may affect the operation of the movable members. Furthermore, attaching the sensors to the test objects results in a complicated system configuration, thereby increasing manufacturing costs.

Another possible configuration for locating a defective test object is providing a plurality of sensors at positions certain distances away from the test objects to implement a source location technique. However, with this structure, the propagation paths of an elastic wave from the defective test object to the sensors are dependent on the structure of the system, and are generally complicated. If a structure is present in the middle of the path and prevents the propagation of an elastic wave, it is extremely difficult to correctly locate the source of the elastic wave.

The detection system according to the present embodiment is configured to detect an elastic wave from a test object attached to a member (connecting member) having a thickness smaller than the wavelength of the elastic wave to be detected, via the connecting member and a member (base member) on which a plurality of sensors are provided. Using a connecting member having a thickness smaller than the wavelength of the elastic wave turns the elastic wave propagating through the connection member into what is called a guided wave, which propagates with low attenuation. This configuration can accurately locate the source of the elastic wave, or determine the connecting location between the base member and a connecting member attached to a defective test object even if the number of sensors is smaller than the number of test objects. Furthermore, this configuration eliminates the need for directly attaching the sensors to the test objects, and thus is less likely to affect the function of the test objects. In other words, the detection system can detect a defect with a simple configuration without affecting the function of the test objects.

FIG. 1 is a schematic diagram illustrating an example configuration of a detection system according to the present embodiment. In FIG. 1, a plurality of test objects 11a to 11c are disposed in a three-dimensional space. The test objects 11a to 11c include, for example, movable members and are elements of a system, which is not illustrated. The test objects 11a to 11c are collectively referred to as test objects 11 unless otherwise specified. Examples of the test objects 11 include bearings included in rollers for conveying sheet-like materials.

The test objects 11a to 11c are connected with a base member 10 by connecting members 12a to 12c. The base member 10 is, for example, a plate-like member. The base member 10 may be, for example, a flat member or a curved member. The base member 10 is not necessarily an independent plate, but may be a relatively flat portion of a sphere or another three-dimensional shape.

The thickness of the base member 10 may be smaller than the wavelength of the elastic wave. This configuration can excite a guided wave that radially propagates with low attenuation from a contact point between the connecting members 12a to 12c and the base member 10 as the source of the wave, and can increase the signal-to-noise (SN) ratio in detecting signals.

On the base member 10, sensors 3a to 3d are provided that are configured to detect vibrations (elastic wave) propagating on the base member 10. The sensors 3a to 3d have the same configuration and may be collectively referred to as sensors 3 unless otherwise specified. The number of sensors 3 is not limited to four, and may be two, three, or more than five.

The sensors 3 include piezoelectric elements having a sensitivity ranging, for example, from 10 kHz to 1 MHz. Examples of the sensors 3 include a resonant-type sensor detecting a resonance peak in a frequency range and a wide-band sensor detecting a smaller resonance. The sensors 3 may be any type of sensors. The sensors 3 may include a preamplifier. To detect the elastic wave, the sensors 3 may be, for example, voltage-output sensors, variable resistance sensors, or capacitive sensors. The sensors 3 may use any method to detect elastic waves.

The connecting members 12a to 12c are members for connecting the test objects 11 with the base member 10, and may be, for example, bar-like members. The connecting members 12a to 12c have the same configuration and may be collectively referred to as connecting members 12 unless otherwise specified.

The connecting members 12 can be a solid member having a thickness (diameter) smaller than the wavelength of an elastic wave to be detected, or a hollow member defined by an outer shell having a thickness (thickness of the shell) smaller than the wavelength of the elastic wave. An elastic wave traveling in a connecting member 12 having a thickness smaller than the wavelength becomes what is called a guided wave, and propagates in the longitudinal direction of the connecting member 12 with low attenuation. The guided wave propagating in the longitudinal direction of the connecting member 12 is converted, at the contact portion between the base member 10 and the connecting member 12, into a wave that travels in the base member 10 from the new source of the wave.

The wave traveling in the base member 10 reaches the sensors 3a to 3d at a different time corresponding to the distances to the sensors 3a to 3d. By using the difference in time and the information on the propagation speed of the elastic wave, the location of the source on the base member 10 can be determined. What is determined is a location (contact portion) at which the base member 10 and a connecting member 12 are connected. Whether a defect is present can be determined based on, for example, the number of sources of the elastic wave and the characteristics of the waveform.

The connecting members 12 are attached to the test objects 11 in, for example, one-to-one correspondence. Determining the contact location of a connecting member 12 can simultaneously determine a defective test object 11. A single connecting member 12 may be connected to a plurality of test objects 11. For example, a plurality of test objects 11 may be coaxially attached to one connecting member 12. In this case, determining a contact location between the base member 10 and a connecting member 12 can determine that any one of the test objects 11 attached to the connecting member 12 has a defect.

Figure 2:
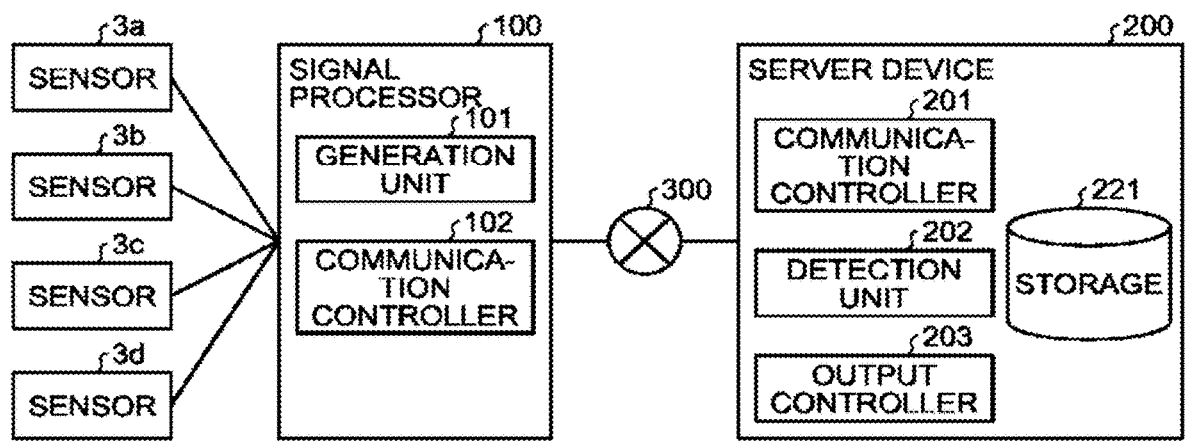
FIG. 2 is a block diagram illustrating a configuration of functions of the detection system according to the embodiment.

FIG. 2 is a diagram illustrating an example configuration of functions of the detection system according to the present embodiment. The detection system according to the present embodiment includes the sensors 3a to 3d, a signal processor 100, and a server device 200. The signal processor 100 includes a generation unit 101 and a communication controller 102. The server device 200 includes a communication controller 201, a detection unit 202, an output controller 203, and storage 221.

The sensors 3a to 3d are configured to detect an elastic wave from the test objects. Upon detecting an elastic wave, the sensors 3 convert the elastic wave into a detection signal such as a voltage signal. The sensors 3 transmit their detection signals to the signal processor 100.

The signal processor 100 may include a function of amplifying the detection signals received from the sensors 3. If the sensors 3 include amplifiers, the signal processor 100 does not necessarily perform such amplification processing.

The generation unit 101 generates, from the detection signals received from the sensors 3, information for use in the defect detection processing performed by the detection unit 202 of the server device 200. The generation unit 101 converts an analogue detection signal into a digital detection signal. If the resulting digital detection signal is equal to or larger than a detection threshold, the generation unit 101 generates time information indicating the detection time of the detection signal and feature information indicating features of the detection signal.

Examples of the feature information include amplitude (mV) of the waveform of the detection signal, duration (usec) of the waveform of the detection signal, zero crossing count (times) of the detection signal, energy (arb.) of the waveform of the detection signal, and the frequency (Hz) of the detection signal.

The communication controller 102 controls the communication with an external device such as the server device 200. Upon receiving the feature information and the time information from the generation unit 101, the communication controller 102, for example, transmits the feature information and the time information to the server device 200.

The communication controller 201 of the server device 200 controls communication with an external device such as the signal processor 100. The communication controller 201 (reception unit), for example, receives the feature information and the time information from the signal processor 100. The communication controller 201 stores the received feature information and time information in, for example, the storage 221.

The detection unit 202 reads the feature information and the time information from the storage 221, and uses the feature information and the time information to detect the connecting location between the base member and a connecting member to which a defective test object is attached. The detection unit 202 may determine, for example, the degree of defect of the defective portion by using the feature information.

The storage 221 stores therein various types of information for use in the processing performed by the server device 200. For example, the storage 221 stores therein the feature information and the time information received from the signal processor 100. The storage 221 can be configured by any type of widely used recording medium, such as a flash memory, a memory card, a random access memory (RAM), a hard disk drive (HDD), or an optical disc.

The output controller 203 controls output of, for example, a result of processing performed by the server device 200. For example, the output controller 203 outputs (displays) a detection result of the detection unit 202 to a display device, which is not illustrated. The output method is not limited to this, and the output controller 203 may output the detection result by any means. For example, the output controller 203 may transmit the detection result to a designated destination device (e.g., a device used by the administrator) via a network 300 such as the Internet.

The configuration of the detection system illustrated in FIG. 2 is presented for illustrative purposes only and may be modified as appropriate. For example, functions of the server device 200, such as the detection unit 202, may be included in the signal processor 100.

Described next is the wavelength of the elastic wave. It is generally known that elastic waves are generated upon growth of internal defects in materials used for mechanical parts. Upon growth of a defect in a test object, an elastic wave is generated.

A propagation speed v of the elastic wave traveling in a material can be represented by the following expression (1), $$v = \sqrt{\frac{\kappa}{\rho_0}} \quad (1)$$

where $\kappa$ (Pa) is bulk modulus of the material, and $\rho_0$ (kg/m$^3$) is its density.

When the material has a three-dimensional structure, the propagation speed v is represented by the following expression (2), $$v = \sqrt{\frac{1}{\rho_0} \cdot \left(K + \frac{4}{3}G\right)} \quad (2)$$

where G is a shear modulus.

In other words, the propagation speed v of an elastic wave traveling in a material is determined by the unique physical properties of the material. An elastic wave (AE wave) generated upon formation of a defect has frequency components of about 100 kHz to 1 MHz if the material is metal, and about 10 to 50 kHz if the material is concrete. This means that the wavelength of an elastic wave to be detected is generally determined by the material of the test object.

In this regard, the thickness of the connecting members 12 and the base member 10 can be determined in accordance with the wavelength of the elastic wave determined by the material of the test objects.

Figure 3:
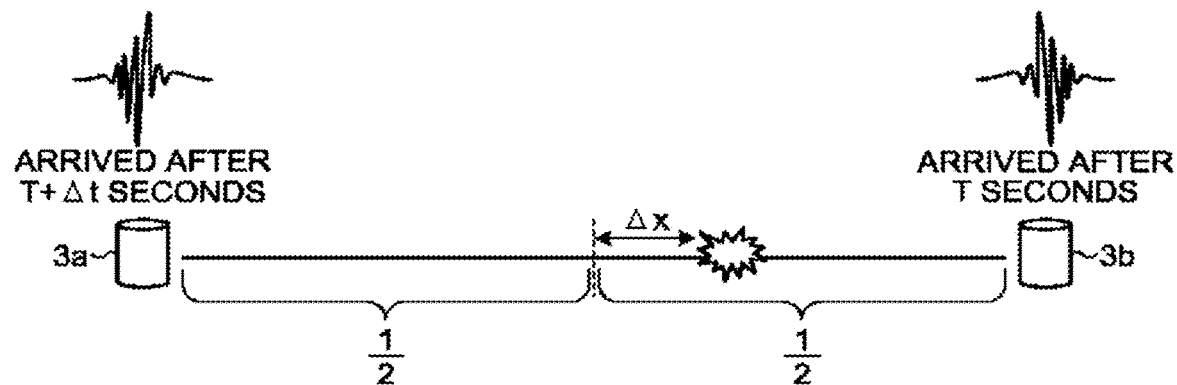
FIG. 3 is a diagram illustrating an example of a source location method according to the embodiment.

Described next is a source location method using an elastic wave detected by the sensors 3. FIG. 3 is a diagram illustrating an example of a source location method according to the present embodiment for one-dimensional configuration. In this case, the detection system has to include at least two sensors 3a and 3b.

The following describes an example situation in which a crack occurs in a test object between the sensors 3a and 3b, and the sensors 3a and 3b detect an elastic wave generated upon formation of the crack. Let the distance between the sensors 3a and 3b be 1. Let the distance from the center between the sensors 3a and 3b to the crack be $\Delta x$. If the sensor 3b detects an elastic wave T seconds after the formation of the crack and the sensor 3a detects the elastic wave T+$\Delta t$ seconds after the formation of the crack, the time difference information $\Delta t$ can be represented by the following expression (3).

$$\Delta t = \left(\left(\frac{1}{2} + \Delta x\right) - \left(\frac{1}{2} - \Delta x\right)\right) \bigg/ v = 2\Delta x / v \quad (3)$$

The time difference information $\Delta t$ can be calculated from, for example, the feature information and time information corresponding to the detection signals from the sensors 3. For example, the time difference information $\Delta t$ can be calculated from a difference of time information corresponding to similar feature information. If the distance 1 between the sensors 3a and 3b and the propagation speed v of the elastic wave are known, the distance $\Delta x$ from the center between the sensors 3a and 3b to the crack can be calculated from the calculated time difference information $\Delta t$ and expression (3). In other words, the detection unit 202 can determine the positional information on the crack (source of elastic wave) from the time difference information $\Delta t$.

Figure 4:
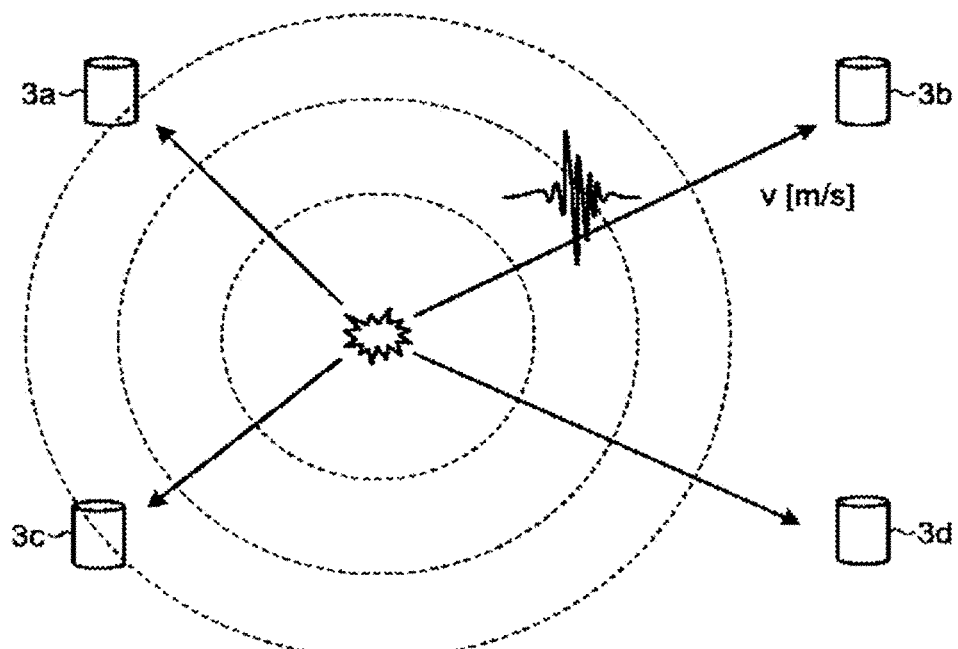
FIG. 4 is a diagram illustrating another example of the source location method according to the embodiment.
Figure 5:
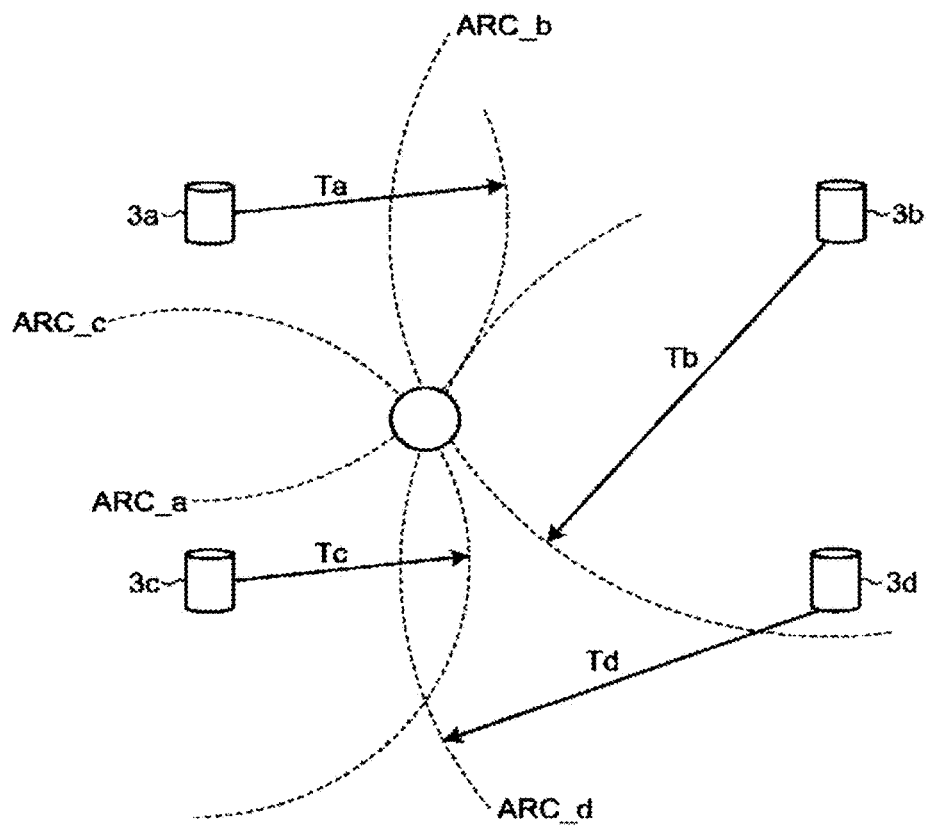
FIG. 5 is a diagram illustrating another example of the source location method according to the embodiment.

Described next is an example of two-dimensional configuration. FIGS. 4 and 5 are diagrams illustrating an example of a source location method according to the present embodiment for two-dimensional configuration. FIG. 4 illustrates an example situation in which a crack occurs in a test object and an elastic wave from the crack reaches the sensors 3a to 3d at a propagation speed v (m/s). The sensors 3a to 3d receive the elastic wave at different time. If a difference in reception time of the elastic wave is obtained, the detection system can estimate that, as illustrated in FIG. 5, the source of the elastic wave is located at a position on a circumference ARC_a (radius Ta), a circumference ARC_b (radius Tb), a circumference ARC_c (radius Tc) and a circumference ARC_d (radius Td). In other words, the detection unit 202 can determine the intersection of the circumferences ARC_a to ARC_d to be the source of the elastic wave.

In general, using one more sensors 3 than the number of dimensions can determine the location of the source of elastic wave. In three-dimensional configuration, using at least four sensors 3 can determine the location of the source of elastic wave. When more sensors 3 are used, the detection system can determine the positional information more accurately.

Figure 6:
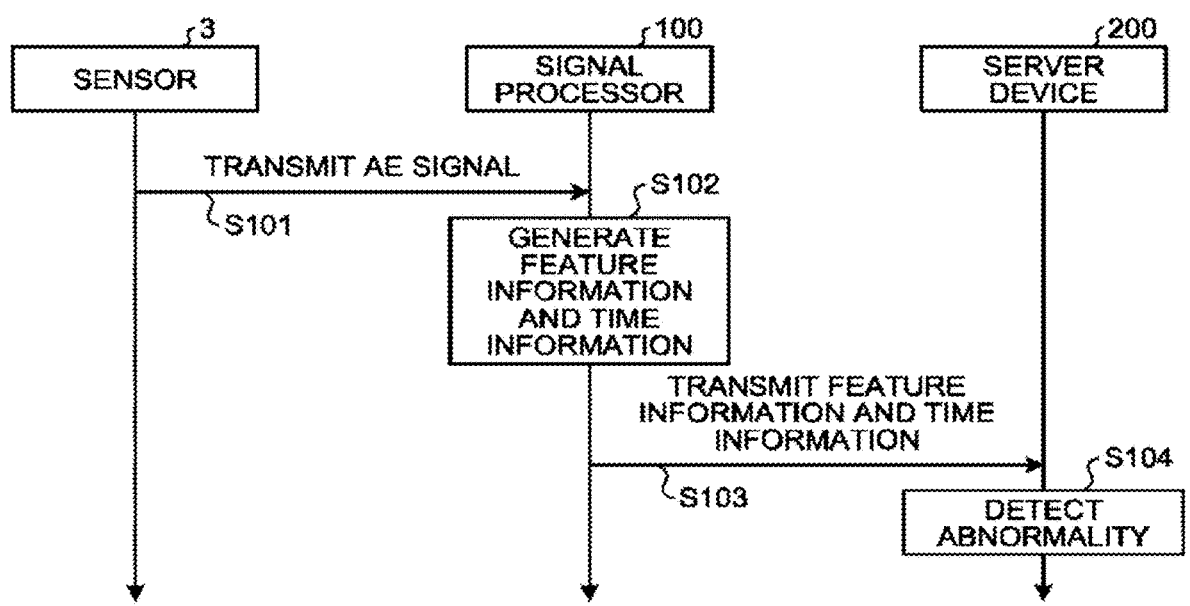
FIG. 6 is a sequence diagram illustrating detection processing according to the embodiment.

Described next is defect detection processing of the detection system according to the present embodiment. FIG. 6 is a sequence diagram illustrating an example of detection processing according to the present embodiment.

Upon detecting an elastic wave, the sensors 3 transmit AE signals to the signal processor 100 (Step S101). The signal processor 100 (generation unit 101) generates feature information and time information from the AE signals (Step S102). The signal processor 100 (communication controller 102) transmits the generated feature information and time information to the server device 200 (Step S103). By using the transmitted feature information and time information, the server device 200 (detection unit 202) detects the location of a contact portion between the base member 10 and a connecting member 12 corresponding to a test object in which abnormality (defect) has occurred (Step S104). The output controller 203 may output the detection result to, for example, a display device.

Figure 7:
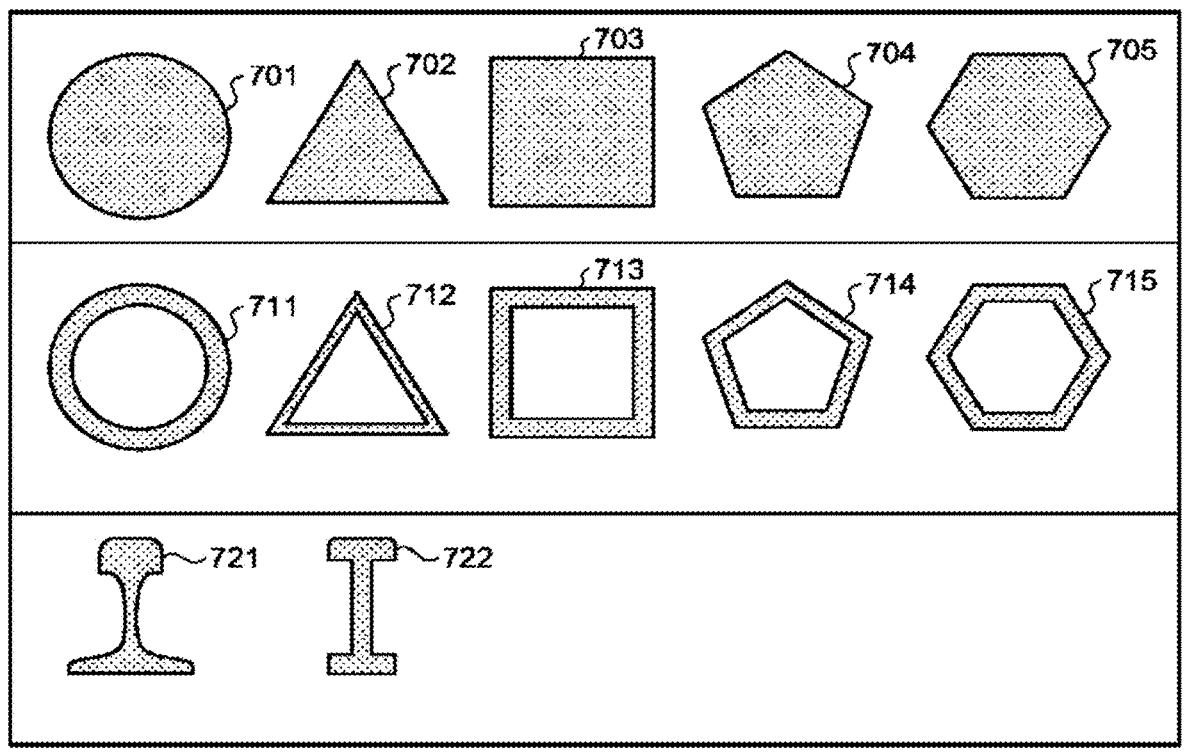
FIG. 7 is a diagram illustrating example cross-sections of connecting members.

Described next is the shape of the connecting members 12. FIG. 7 is a diagram illustrating example cross-sections of the connecting members 12. Cross-sections 701 to 705 are example cross-sections of the connecting members 12 having a solid structure. The cross-sections 701 to 705 are, for example, circle, equilateral triangle, square, regular pentagon, and regular hexagon cross-sections, respectively. For example, the diameter of a circle, the height of a triangle, and the longest diagonal of a polygon are determined to be the thickness of the connecting members 12, and the connecting members 12 having a thickness smaller than the wavelength of the elastic wave can be used.

Cross-sections 711 to 715 are example cross-sections of the connecting members 12 having a hollow structure. The cross-sections 711 to 715 are, for example, circle, equilateral triangle, square, regular pentagon, and regular hexagon cross-sections, respectively, including both hollow portion and outer shell defining the hollow portion of the connecting members 12. The connecting members 12 defined by an outer shell having a thickness smaller than the wavelength of the elastic wave can be used.

The cross-sections 721 and 722 are example cross-sections of the connecting members 12 used for a rail of a railroad.

The shape of the connecting members 12 is not limited to the examples of FIG. 7, and the connecting members 12 may have any shape having a thickness smaller than the wavelength of the elastic wave. For example, the connecting members 12 may have a cross-section of ellipse, or polygons including triangles, rectangles, pentagons, and hexagons other than those illustrated in FIG. 7. The connecting members 12 may be partially bent or may be a member not having a bar-like shape.

Described next are example applications of the detection system other than the example illustrated in FIG. 1. FIGS. 8, 9A, 9B, and 11 are schematic diagrams illustrating other example configurations of the detection system according to the present embodiment.

Figure 8:
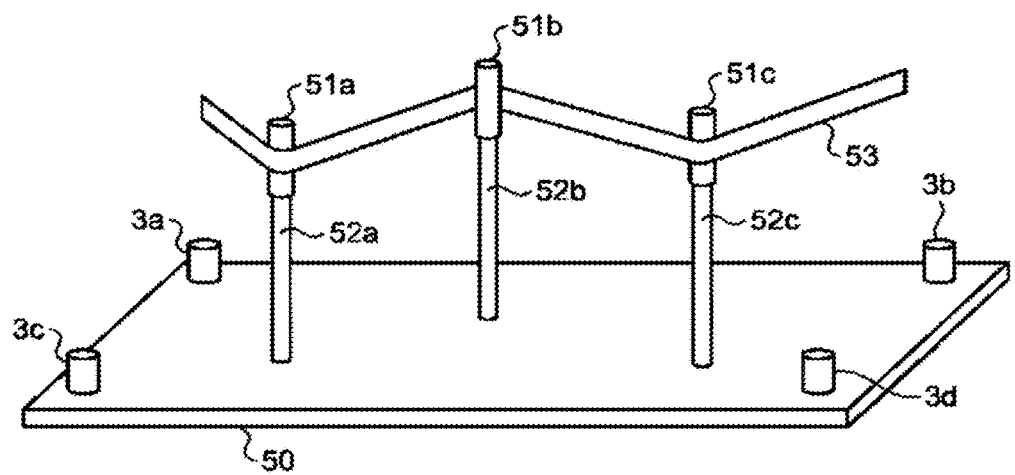
FIG. 8 is a schematic diagram illustrating another example configuration of the detection system according to the embodiment.

FIG. 8 illustrates an example configuration of the detection system including roller bearings 51a to 51c as the test objects that convey a belt-like sheet 53. In FIG. 8, for example, the bearings 51a to 51c, which are the test objects, are disposed in a three-dimensional space. The bearings 51a to 51c are elements of a belt conveyor system, which is not illustrated. The bearings 51a to 51c are connected with a base member 50 by connecting members 52a to 52c. The connecting members 52a to 52c are, for example, solid round bars having a diameter of 20 mm.

The bearings 51a to 51c may be collectively referred to as bearings 51 unless otherwise specified. The connecting members 52a to 52c may be collectively referred to as connecting members 52 unless otherwise specified. In the same manner as the example illustrated in FIG. 1, a plurality of bearings 51 may be coaxially attached to one connecting member 52.

The connecting members 52 and the base member 50 are connected by, for example, screwing. The connecting members 52 and the base member 50 are not necessarily connected by screwing, but may be connected by soldering or gluing. Between the connecting members 52 and the base member 50, coupling members may be provided to enhance the propagation of elastic wave.

An elastic wave from a defect in a bearing 51 propagates through a connecting member 52. Using a solid connecting member 52 having a smaller diameter than the wavelength of the elastic wave to be detected makes the wave traveling in the connecting member 52 a guided wave, which propagates in the longitudinal direction of the connecting member 52 with low attenuation. The guided wave propagating in the longitudinal direction of the connecting member 52 is converted, at the contact portion between the base member 50 and the connecting member 52, into a wave that travels in the base member 50 from the new source of the wave.

The detection system having a configuration illustrated in FIG. 8 can detect a defective bearing 51 while the belt conveyor system including the bearings 51 is in operation without affecting the normal belt-conveying function of the bearings 51 that are the test objects.

Figure 9A:
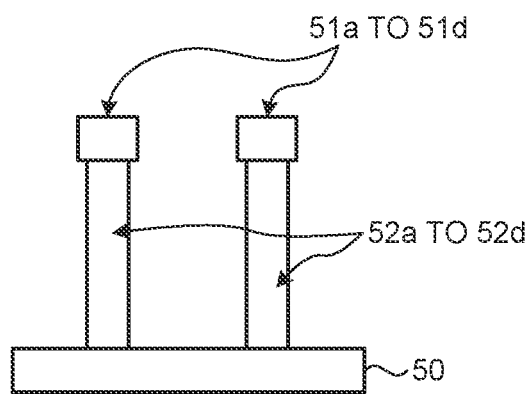
FIG. 9A is a schematic diagram illustrating still another example configuration of the detection system according to the embodiment.
Figure 9B:
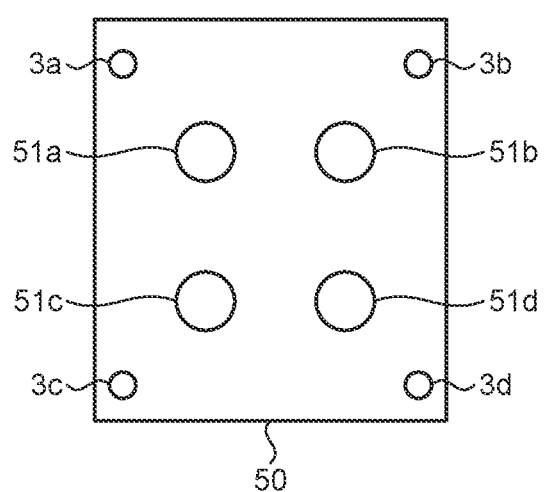
FIG. 9B is a schematic diagram of the still other example configuration of the detection system according to the embodiment.

FIGS. 9A and 9B illustrate another example configuration of the detection system including bearings as test objects. FIG. 9A is a diagram of the detection system seen from a side. FIG. 9B is a diagram of the detection system seen from above. In the example illustrated in FIGS. 9A and 9B, four bearings 51a to 51d are the test objects. In the following description, the bearing 51d has a defect.

Connecting members 52a to 52d are, for example, solid round bars having a diameter of 20 mm to which the bearings 51a to 51d are attached, respectively. The connecting members 52a to 52d are connected to the base member 50 by screwing.

Sensors 3a to 3d are disposed at the four corners of the base member 50.

When the bearings 51a to 51d rotate, an elastic wave is generated from the defective bearing 51d. The elastic wave propagates through a connecting member 52d to the base member 50 and reaches the sensors 3a to 3d. The detection unit 202 can calculate, for example, the source location of the elastic wave on the base member 50 from a difference in time at which the elastic wave reaches the sensors 3a to 3d.

Figure 10:
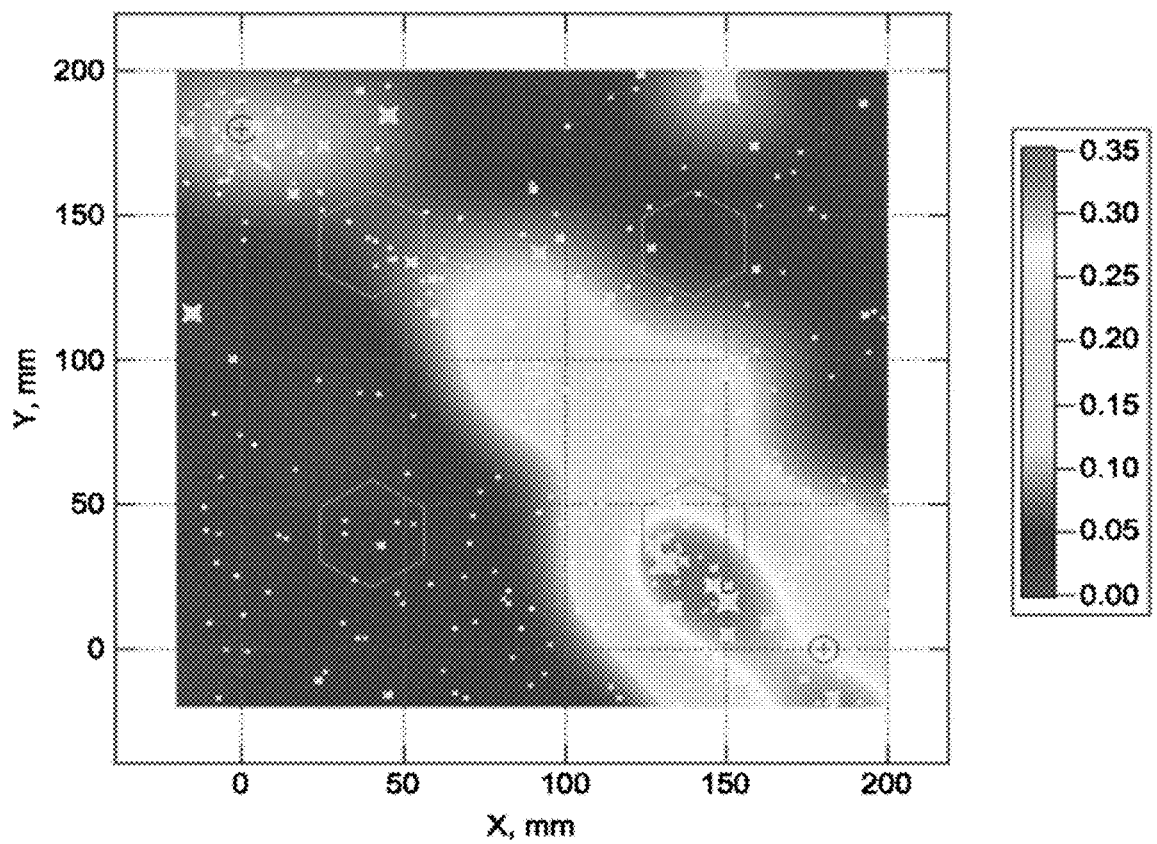
FIG. 10 is a chart illustrating contours of energy distribution.

The detection unit 202 can obtain energy distribution on the base member 50 based on the energy of the signals detected by the sensors 3a to 3d. FIG. 10 is an example chart illustrating contours of energy distribution. FIG. 10 indicates that the mostly white region at the lower right has a larger energy than other areas. The portion on the base member 50 having a larger energy generally coincides with the location of the defective test object. This indicates that the defective test object has been successfully detected.

Figure 11:
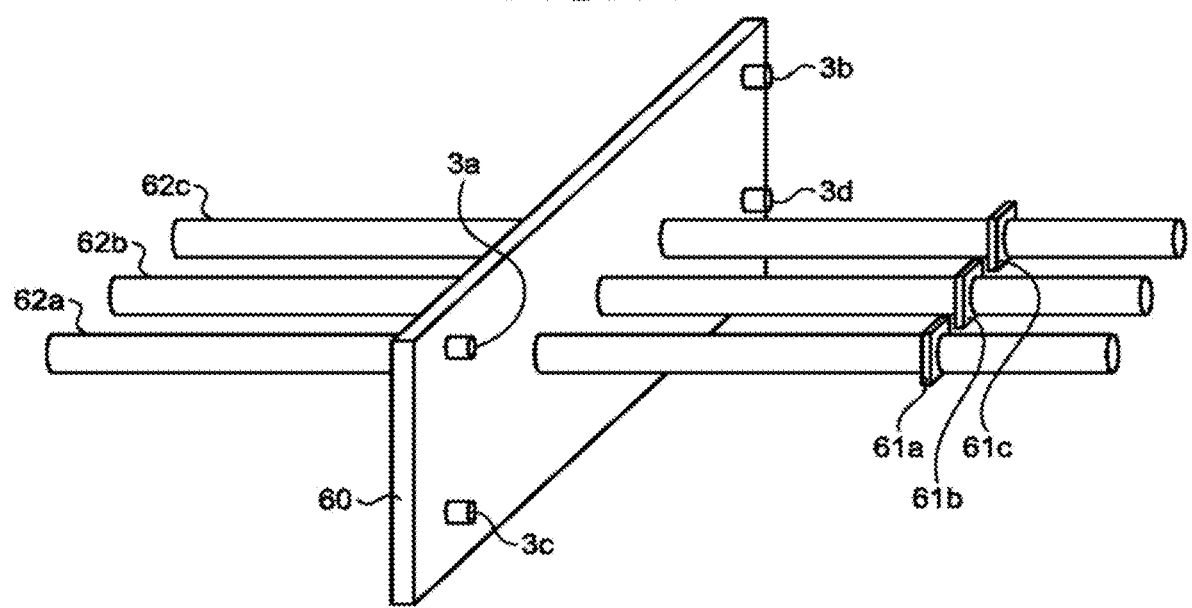
FIG. 11 is a schematic diagram illustrating yet another example configuration of the detection system according to the embodiment.

FIG. 11 illustrates an example configuration of the detection system including pipe joints 61a to 61c as the test objects that connect pipes. In FIG. 11, the pipe joints 61a to 61c, which are the test objects, are disposed in a three-dimensional space. The pipe joints 61a to 61c are elements of a pipe system, which is not illustrated. The pipe joints 61a to 61c are connected with a base member 60 by connecting members 62a to 62c, respectively. The connecting members 62a to 62c are, for example, hollow pipes having a diameter of 20 mm.

The pipe joints 61a to 61c may be collectively referred to as pipe joints 61 unless otherwise specified. The connecting members 62a to 62c may be collectively referred to as connecting members 62 unless otherwise specified. In the same manner as the example illustrated in FIG. 1, a plurality of pipe joints 61 may be attached to one connecting member 62.

The connecting members 62 and the base member 60 are connected by, for example, screwing via flanges. The connecting members 62 and the base member 60 are not necessarily connected by screwing, but may be connected by soldering or gluing. Between the connecting members 62 and the base member 60, coupling members may be provided to enhance the propagation of elastic wave.

An elastic wave from a defect in a pipe joint 61 propagates through a connecting member 62. Using a hollow connecting member 62 having a smaller thickness than the wavelength of an elastic wave to be detected makes the wave traveling in the connecting member 62 a guided wave, which propagates in the longitudinal direction of the connecting member 62 with low attenuation. The guided wave propagating in the longitudinal direction of the connecting member 62 is converted, at the contact portion between the base member 60 and the connecting member 62, into a wave that travels in the base member 60 from the new source of the wave.

The detection system having a configuration illustrated in FIG. 11 can detect a defective pipe joint 61 while the pipe system including the pipe joints 61 is in operation without affecting the normal function of the pipe joints 61 that are the test objects. Although the pipe joints 61 are described as test objects, the connecting members 62, which are pipes, may be inspected instead of the pipe joints.

According to the embodiment above, the detection system can detect a defect with a simple configuration without affecting the function of the test objects.

Described next are hardware configurations of the devices (signal processor 100, server device 200) according to the embodiment.

Figure 12:
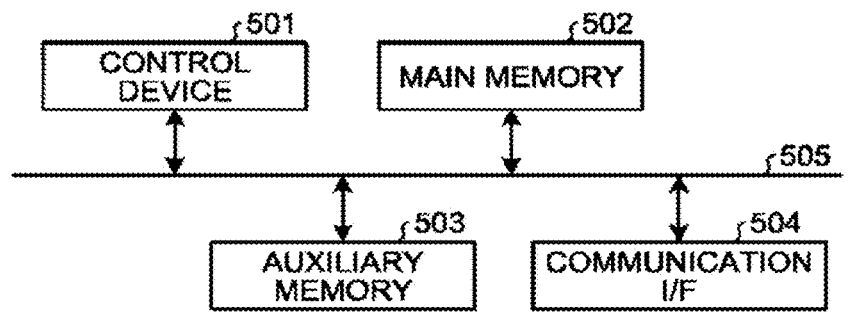
FIG. 12 is a diagram illustrating a hardware configuration of a signal processor according to the embodiment.

FIG. 12 is a diagram illustrating an example hardware configuration of the signal processor 100 according to the embodiment. The signal processor 100 according to the embodiment includes a control device 501, a main memory 502, an auxiliary memory 503, and a communication interface (I/F) 504. The control device 501, the main memory 502, the auxiliary memory 503, and the communication I/F 504 are connected via a bus 505.

The control device 501 is, for example, a central processing unit (CPU) that executes a computer program read from the auxiliary memory 503 to the main memory 502. The main memory 502 is, for example, a read only memory (ROM) and a RAM. The auxiliary memory 503 is, for example, a memory card.

The communication I/F 504 is an interface for communicating with, for example, the server device 200.

The computer program executed by the signal processor 100 according to the embodiment is recorded on a computer-readable recording medium such as a compact disc read only memory (CD-ROM), a memory card, a compact disc recordable (CD-R), and a digital versatile disc (DVD) as an installable or executable file and is provided as a computer program product.

The computer program executed by the signal processor 100 according to the embodiment may be stored in a computer connected to a network such as the Internet and provided by being downloaded via the network. Furthermore, the computer program executed by the signal processor 100 according to the embodiment may be provided via a network such as the Internet without being downloaded.

The computer program executed by the signal processor 100 according to the embodiment may be embedded and provided in a ROM, for example.

The computer program executed by the signal processor 100 according to the embodiment has a module configuration that can implement functional blocks including the functional blocks of the signal processor 100 illustrated in FIG. 2. As actual hardware, these functional blocks are loaded on the main memory 502 when the control device 501 reads out the computer program from a recording medium and executes it. In other words, these functional blocks are generated on the main memory 502.

Some or all of the functional blocks described above may be implemented by hardware such as an integrated circuit (IC) without being implemented by software.

When a plurality of processors are used to implement these functions, each of the processors may implement one of the functions above or two or more of the functions above.

Figure 13:
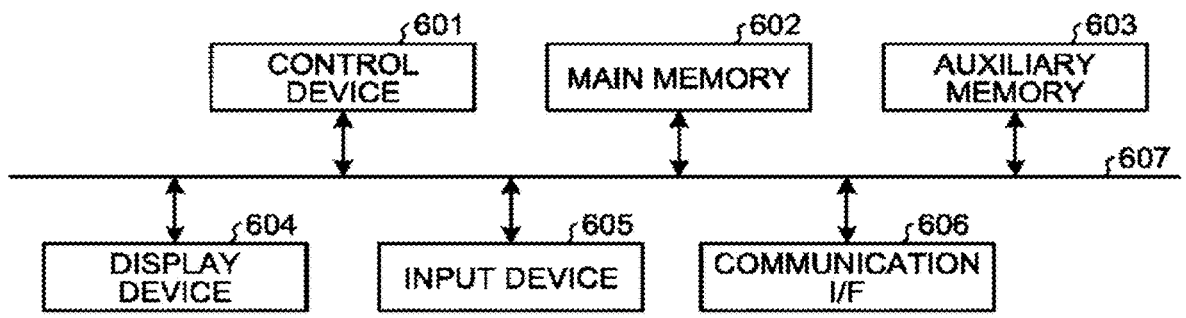
FIG. 13 is a diagram illustrating a hardware configuration of a server device according to the embodiment.

FIG. 13 is a diagram illustrating an example hardware configuration of the server device 200 according to the embodiment. The server device 200 according to the embodiment includes a control device 601, a main memory 602, an auxiliary memory 603, a display device 604, an input device 605, and a communication I/F 606. The control device 601, the main memory 602, the auxiliary memory 603, the display device 604, the input device 605, and the communication I/F 606 are connected via a bus 607.

The control device 601 is, for example, a CPU that executes a computer program read from the auxiliary memory 603 to the main memory 602. The main memory 502 is, for example, a ROM and a RAM. The auxiliary memory 603 is, for example, an HDD and a memory card. The storage 221 illustrated in FIG. 2 corresponds to, for example, the main memory 602 and the auxiliary memory 603.

The display device 604 displays, for example, the state of the server device 200. The display device 604 is, for example, a liquid crystal display. The input device 605 is an interface for operating the server device 200. The input device 605 is, for example, a keyboard and a mouse. When the server device 200 is a smart device such as a smart phone and a tablet, the display device 604 and the input device 605 are, for example, a touch screen. The communication I/F 606 is an interface for communicating with, for example, the signal processor 100.

The computer program executed by the server device 200 according to the embodiment is recorded on a computer-readable recording medium such as a CD-ROM, a memory card, a CD-R, and a DVD as an installable or executable file and is provided as a computer program product.

The computer program executed by the server device 200 according to the embodiment may be stored in a computer connected to a network such as the Internet and provided by being downloaded via the network. Furthermore, the computer program executed by the server device 200 according to the embodiment may be provided via a network such as the Internet without being downloaded.

The computer program executed by the server device 200 according to the embodiment may be embedded and provided in a ROM, for example.

The computer program executed by the server device 200 according to the embodiment has a module configuration that can implement functional blocks including the functional blocks of the server device 200 illustrated in FIG. 2. As actual hardware, these functional blocks are loaded on the main memory 602 when the control device 601 reads out the computer program from a recording medium and executes it. In other words, these functional blocks are generated on the main memory 602.

Some or all of the functional blocks illustrated in FIG. 2 may be implemented by hardware such as an IC without being implemented by software.

When a plurality of processors are used to implement these functions, each of the processors may implement one of the functions above or two or more of the functions above.

The server device 200 according to the embodiment may be operated in any mode. The server device 200 according to the embodiment may be operated as, for example, a cloud computing system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection system, comprising:
   a base member;
   a plurality of sensors provided on the base member, the sensors being configured to detect an elastic wave from a test object of a plurality of test objects, the elastic wave propagating through a connecting member among a plurality of connecting members that connect the test objects to the base member, the connecting members each having a thickness smaller than a wavelength of the elastic wave, the base member having a thickness smaller than the wavelength of the elastic wave; and
   one or more processors configured to detect an abnormality of the test objects based on the detected elastic wave.

2. The detection system according to claim 1, wherein the connecting members are solid members having a thickness smaller than the wavelength of the elastic wave or hollow members defined by an outer shell having a thickness smaller than the wavelength of the elastic wave.

3. The detection system according to claim 1, wherein each of the connecting members connects one of the test objects to the base member.

4. The detection system according to claim 1, wherein at least one of the connecting members connects two or more of the test objects to the base member.

5. The detection system according to claim 1, wherein the test objects are bearings attached to the connecting members.

6. The detection system according to claim 1, wherein
   the connecting members are pipes, and
   the test objects are pipe joints for joining the pipes to form a pipe system.

7. The detection system according to claim 1, wherein the one or more processors determine a connecting location between the base member and the connecting member to which the test object having an abnormality is connected, based on a difference in time at which the elastic wave reaches the sensors.

8. A detection method, comprising:
   detecting, by a plurality of sensors provided on the base member, an elastic wave from a test object of a plurality of test objects, the elastic wave propagating through a connecting member among a plurality of connecting members that connect the test objects to the base member, the connecting members each having a thickness smaller than a wavelength of the elastic wave, the base member having a thickness smaller than the wavelength of the elastic wave; and
   detecting an abnormality of the test objects based on the detected elastic wave.

9. A server device, comprising:
   one or more processors configured to:
      receive, from a plurality of sensors provided on a base member, detection information on an elastic wave from a test object of a plurality of test objects, the elastic wave propagating through a connecting member among a plurality of connecting members that connect the test objects to the base member, the connecting members each having a thickness smaller than a wavelength of the elastic wave, the base member having a thickness smaller than the wavelength of the elastic wave; and
      detect an abnormality of the test objects based on the detected elastic wave.

* * * * *